Dec. 31, 1968     D. J. H. GODDIN     3,418,850
DEVICE FOR MEASURING THE PRESSURE BETWEEN TWO SURFACES
AT LEAST ONE OF WHICH IS A ROLL

Filed March 7, 1966     Sheet 1 of 2

INVENTOR
DEREK JOSEPH
HARRY GODDIN
BY
Young + Thompson
ATTORNEYS

United States Patent Office 3,418,850
Patented Dec. 31, 1968

3,418,850
DEVICE FOR MEASURING THE PRESSURE BETWEEN TWO SURFACES AT LEAST ONE OF WHICH IS A ROLL
Derek Joseph Harry Goddin, 56 Yew Tree Road, Southborough, Tunbridge Wells, Kent, England
Filed Mar. 7, 1966, Ser. No. 532,381
Claims priority, application Great Britain, Mar. 11, 1965, 10,419/65
9 Claims. (Cl. 73—141)

ABSTRACT OF THE DISCLOSURE

Device for measuring the effective pressure developed between two surfaces, at least one of which is of roll form and at least one of which is of resiliently deformable material, in which a flexible metal plate overlying and normally slightly spaced from a resistance wire winding around a thin insulating strip is forced into short circuiting contact with different lengths of such winding in dependence upon the appled pressure and consequent deformation of said deformable material surface.

---

This invention relates to a device for indicating the effective pressure developed between two opposing surfaces at least one of which is of roll form and at least one of which is of resiliently deformable material as in a printing or inking couple of a printing press. While the invention is particularly applicable to printing machinery, it obviously has other applications where equivalent conditions arise.

Broadly in accordance with the invention a device for indicating the effective pressure developed between two opposing surfaces at least one of which is of roll form and at least one of which is of deformable material, comprises a pressure/electric resistance transducer for insertion between said surfaces, said transducer comprising a thin strip of sheet insulating material, and an electric resistance carried by said strip of insulating material, said resistance having a plurality of parallel limbs in spaced relationship on one side of said strip with at least a part of each of said limbs exposed for electrical connection therewith. First and second electrical connections are provided to the respective opposite ends of said resistance, and a flexible metal contact plate overlies at least the exposed parts of said limbs. Resilient mounting means are provided, which mount said contact plate closely adjacent to and normally operative to hold said contact plate spaced from said limbs and out of electrical contact therewith, the flexible metal contact plate being deformable when the transducer is inserted between said surfaces with said resistance limbs lying parallel to the axes of said roll form surface to cause short circuiting of a length of said resistance thereby to alter the electrical resistance between said first and second connections in dependence upon the pressure developed between said surfaces.

In order that the nature of the invention may be better understood embodiments thereof will now be described by way of illustrative example only and with reference to the accompanying drawing in which:

FIGURE 6 is a transverse cross sectional view, similar to FIG. 3 of a slightly modified form of transducer while:

Figure 1:
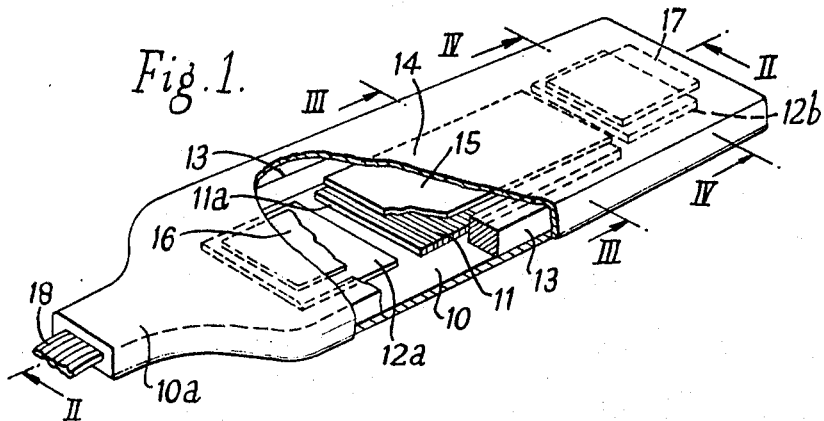
FIGURE 1 is a perspective view, shown partly in section, of one form of pressure sensitive electrical resistance or pressure/resistance transducer for use in devices in accordance with the invention.
Figure 2:
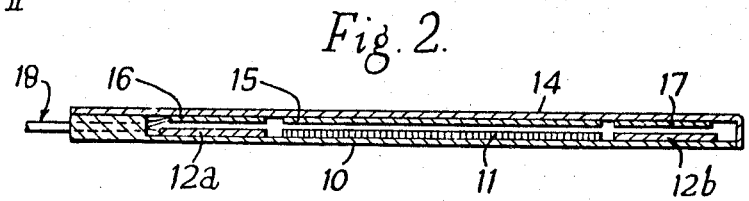
FIGURE 2 is a longitudinal cross sectional view of the transducer, taken on the line II—II of FIG. 1.
Figure 3:
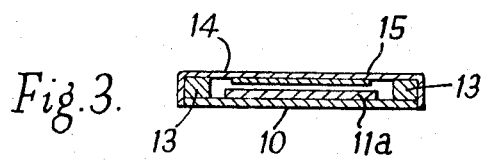
FIGURES 3 and 4 are transverse cross sectional views of the same transducer taken respectively on the lines III—III and IV—IV of FIG. 1.
Figure 4:
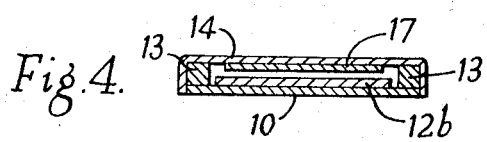

Referring first to FIGS. 1–4 of the drawings these show one form of pressure sensing element effectively operating as a pressure-to-electrical-resistance transducer. Such element comprises a thin base strip 10 of non-electrically conductive material and of substantially rectangular shape. Upon one surface of this strip 10 intermediate its ends is secured a shorter and narrower strip of electrical insulating material 11a closely wound with thin electric resistance wire 11.

The winding 11 may be made with bare resistance wire provided the adjacent turns thereof are placed and maintained in spaced-apart relation to one another but more preferably use is made of insulated resistance wire with adjacent turns touching one another. The surface of each winding turn on the side of the strip 11a opposite that secured to the base strip 10 is then bared in the manner usual in wire-wound potentiometers or the like. In another alternative the resistance may be formed by printed circuit methods in which case it may have the form of a sinuous resistive track deposited on one side only of the strip 11a. The term "winding" as used herein with reference to the resistance 11 is intended to include such alternative.

Beyond the respective opposite ends of the strip 11a thin metal electrode plates 12a and 12b are also secured to the same surface of the strip 10. These plates are conveniently of the same thickness as the overall thickness of the strip 11a and its resistance winding 11. Secured along each longitudinal edge region of the strip 10 is a rectangular section strip 13 of rubber or similar resilient compressible material. Such strips 13 are of greater ance-carrying strip 11a and the two electrode plates 12a 12b while overlying such strips 13 and acting also to enclose and seal the space containing the strip 11a and plates 12a, 12b is a membrane 14 conveniently also of thin sheet rubber or liker esilient material. To the inner surface of this membrane at positions opposing the resistance-carrying strip 11a and the two electrode plates 12a, 12b, are secured further thin and flexible metal contact strips 15, 16 and 17 respectively.

The membrane 14 is stretched to be in taut condition between the edge strips 13 and the thickness of the latter is such that said contact strips 15, 16, 17 normally lie out of contact with the resistance winding 11 on the strip 11a and the electrode plates 12a, 12b. Individual external connections are provided by means of thin flexible and insulated conductors 18a, 18b, 18c, 18d and 18e respectively to each end of the resistance winding 11, to each of the contact strips 16 and 17 and, in common, to the two electrode plates 12a, 12b. Such conductors are conveniently led out in a multi-core cable 18 through a neck region 10a integral with the strip 10.

In the operation of this sensing element it is placed in the nip between a pair of rolls or between a roll and a flat bedplate, for example, a printing couple. The sensing element is located so that its longitudinal axis is at right angles to the roll axis whereby the edge strips 13 become compressed and the central contact strip 15 brought into contact with the surfaces of the turns of the resistance winding 11. This causes short-circuiting of a part of the resistance winding over a length which is determined by any deformation of the roller and the edge strips 13 due to the pressure developed in the nip. The change of the value of the resistance, as measured between its two ends connected to leads 18a, 18b, provides an indication representative of the developed nip pressure. The opposite pairs of end electrode plates 12a, 12b and their associated contact strips 16, 17 are used to ensure location of the sensing element centrally so that the whole of the compressed area overlies the resistance 11. This is effected by first testing to see that neither pair of the electrode/contact plates 12a, 16 or 12b, 17 are in contact.

The pressure sensing element is preferably formed of materials which provide flexibility at least to bending in the longitudinal direction to facilitate its insertion between the opposing pressure surfaces and to allow any necessary slight deformation caused by the pressure between the opposing surfaces.

The nature and thickness of the base strip 10 and the membrane 14 are governed to some extent by the character of the surfaces whose applied pressure is being measured. If the surface engaging the membrane 14 is of resilient and deformable character, e.g. as in a blanket roller or a rubber, plastic or composition form printing roller, the base strip 10 may be substantially non-compressible. The deformation of such roller under the applied pressure provides the variable extension of the pressure area between contact strip 15 and the winding 11.

Figure 6:
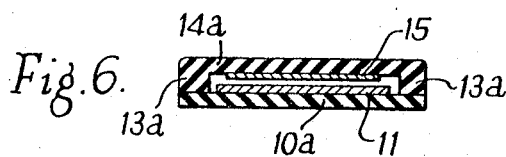
Figure 7:
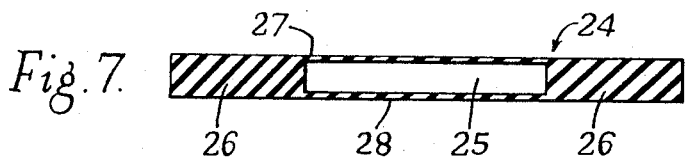
FIGURE 7 is a cross-sectional view of a sleeve for use in conjunction with a transducer as shown in FIGS. 1–4 between rigid pressure surfaces.

If however, the pressure surface engaging the membrane 14 is of rigid character, then a pressure deformable element should be included in the transducer by increased thickness of the membrane made of resilient compressible material and/or by using a suitably thick base strip also of resilient compressible material as shown at 14a and 10a respectively in FIG. 6. The side spacing strips 13 may be moulded integrally with the membrane 14a as indicated at 13a. Another alternative is shown in FIG. 7 and comprises a sleeve 24 of deformable material such as moulded rubber. This sleeve has a recess 25 shaped to accommodate a transducer of the form shown in FIGS. 1–4 lying between side blocks 26 of substantial cross-sectional area and joined by thin top and bottom walls 27, 28 which flank the membrane 14 and base strip 10 respectively of the inserted transducer.

A sensing element as described may be arranged as part of a resistance measuring circuit of any suitable known form. If the measuring circuit is a direct reading one the indicating meter may be directly calibrated in pressure or other appropriate values. More desirably, a balanced or null-balance circuit is employed in which case the balance control may be directly calibrated in pressure or other appropriate values.

Figure 5:
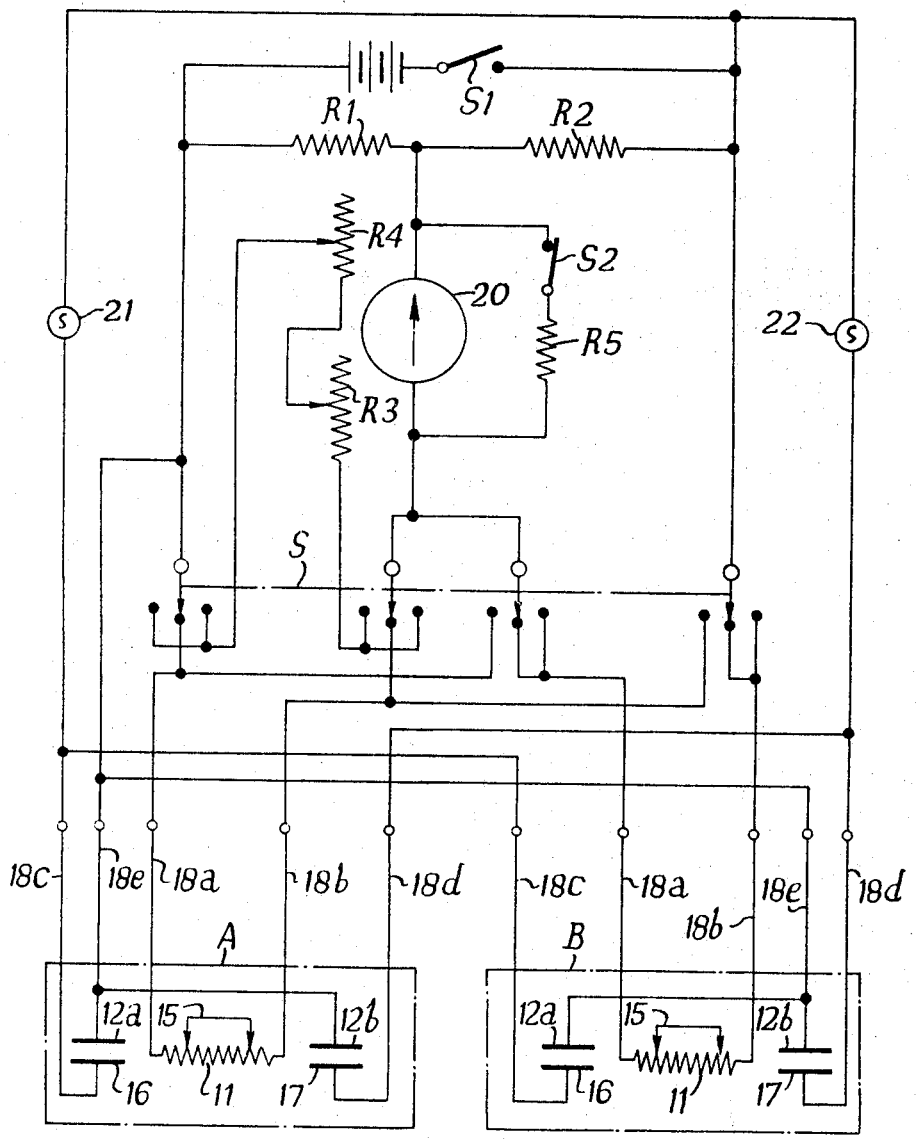
FIGURE 5 is a circuit diagram of one form of pressure measuring device in accordance with the invention and including two transducers similar to that shown in FIGS. 1–4.

FIGURE 5 illustrates the circuit diagram of a preferred arrangement which employs a Wheatstone bridge network and incorporates two pressure/resistance transducers A, B, as already described for opposite ends of the roll nip being dealt with. This circuit arrangement includes a three-position switching means S for dealing firstly with each roll end separately and, secondly, with the two roll ends simultaneously to perform a level test.

The indicating meter 20 (centre zero 50–0–50 μA.) is normally shunted by resistance R5 through normally closed press-button switch S2 to provide alternative sensitivity ranges. The fixed ratio arms of the bridge network comprise resistances R1, R2 (350Ω) while the main bridge balance control is by means of variable resistance R3 (0–250Ω). R4 is a variable trimer resistance (150Ω) for zero setting of the meter. Two, red and green, coloured indicator lamps 21, 22 co-operate with the contact plate strip pairs 12a, 16 or 12b, 17 to ensure correct positioning of the two transducers while, by means of the three different switch positions of the switching means S either the resistance 11 of transducer A or the resistance 11 of transducer B may be connected into the unknown resistance arm of the bridge network for measurement of its resistance by adjustment of resistance R3 in the adjacent arm to achieve bridge balance. The control for the variable resistance R3 is preferably directly calibrated in pressure or other appropriate values. In the third position, the two resistances 11 may be put into the pair of adjacent bridge arms opposing those of the resistances R1, R2. This position allows testing for equality of pressure at each end of the rolls.

When a device in accordance with this invention is used in conjunction with pressure applying rolls whose surface is deformable under pressure, any calibration of the indicating meter or bridge balance control means will be related to the radius of the roll and the nature of the deformable roll surface.

While one particular form has been described by way of illustrative example, many variations are clearly possible. For example, the end contact plates 12a, 12b and the co-operating contact strips 16, 17 may be omitted particularly if the active length of the resistance 11 is suitably extended. More than two transducers for use at several spaced apart positions along the roll length may be provided for use with a single measuring circuit by suitable modification of the switching means S.

I claim:

1. A device for measuring the effective pressure developed between two closely spaced surfaces at least one of which is of roll form and at least one of which is of deformable material, which device includes a pressure/electric resistance transducer for insertion between said surfaces, said transducer comprising a thin strip of sheet insulating material, an electric resistance carried by said strip of insulating material, said resistance having a plurality of parallel limbs in spaced relationship on one side of said strip with at least a part of each of said limbs exposed for electrical connection therewith, a first and second electric connections to the respective opposite ends of said resistance, a flexible metal contact plate overlying at least the exposed parts of said limbs and resilient mounting means mounting said contact plate closely adjacent to and normally operative to hold said contact plate spaced from said limbs and out of electrical contact therewith but being deformable when the transducer is inserted between said surfaces with said resistance limbs lying parallel to the axes of said roll form surface to cause short circuiting of a length of said resistance thereby to alter the electrical resistance between said first and second connections in dependence upon the pressure developed between said surfaces.

2. A device according to claim 1 which comprises an electrical resistance measuring circuit arrangement connected to said first and second electrical connections, said circuit arrangement including an indicating meter calibrated in terms of applied pressure.

3. A device according to claim 2 in which said resilient mounting means comprises a flexible membrane disposed parallel with said resistance-carrying strip, said contact plate being secured to the underside of said membrane.

4. A device according to claim 3 in which said resistance-carrying strip is secured by the side opposite that facing said contact plate to a base strip.

5. A device according to claim 4 in combination with a surrounding sleeve of resilient deformable material, said sleeve having side portions of substantial cross-section adjacent each longitudinal side edge of the transducer and thin walls flanking the said membrane and base strip.

6. A device according to claim 5 which includes two pairs of normally separated electric contacts disposed one just beyond each end of said resistance winding.

7. A device according to claim 6 which includes two electrically operated visual indicator devices, an electric power source, and circuit means connecting each of said indicator devices across said power source through a respective one of said pairs of contacts.

8. A device according to claim 2 in which said resistance measuring circuit arrangement comprises a bridge network including a variable bridge balancing resistance whose control member is calibrated.

9. A device according to claim 8 which comprises a plurality of said pressure/resistance transducers and switching means arranged to connect any one of said transducers to said resistance measuring circuit arrangement.

References Cited

UNITED STATES PATENTS

| | | | |
|---|---|---|---|
| 2,388,966 | 11/1945 | Harrison | 73—141 XR |
| 2,435,254 | 2/1948 | Ramberg | 73—141 XR |
| 2,508,419 | 5/1950 | Ramberg | 338—96 XR |
| 2,695,518 | 11/1954 | Huck | 73—141 |
| 3,024,648 | 3/1962 | Webster | 73—141 |
| 3,093,806 | 6/1963 | Gutterman | 338—42 |

RICHARD C. QUEISSER, *Primary Examiner.*

C. A. RUEHL, *Assistant Examiner.*

U.S. Cl. X.R.

338—47